United States Patent
Ovrutsky et al.

(10) Patent No.: US 12,389,090 B2
(45) Date of Patent: Aug. 12, 2025

(54) IMAGER OPTICAL SYSTEMS AND METHODS

(71) Applicant: Teledyne FLIR Commercial Systems, Inc., Goleta, CA (US)

(72) Inventors: David Ovrutsky, Charlotte, NC (US); William J. Hall, Charlotte, NC (US)

(73) Assignee: Teledyne FLIR Commercial Systems, Inc., Goleta, CA (US)

(*) Notice: Subject to any disclaimer, the term of this patent is extended or adjusted under 35 U.S.C. 154(b) by 162 days.

(21) Appl. No.: 18/184,607

(22) Filed: Mar. 15, 2023

(65) Prior Publication Data

US 2023/0232086 A1 Jul. 20, 2023

Related U.S. Application Data

(63) Continuation of application No. PCT/US2021/051572, filed on Sep. 22, 2021.
(Continued)

(51) Int. Cl.
*H04N 23/23* (2023.01)
*G02B 1/11* (2015.01)
(Continued)

(52) U.S. Cl.
CPC ............. *H04N 23/23* (2023.01); *G02B 1/11* (2013.01); *G02B 7/021* (2013.01); *G06V 20/56* (2022.01)

(58) Field of Classification Search
CPC ...... G02F 1/29; G02F 1/294; G02F 1/133345; G02F 1/134309; G02F 1/13439;
(Continued)

(56) References Cited

U.S. PATENT DOCUMENTS

2002/0030163 A1  3/2002  Zhang
2009/0067041 A1*  3/2009  Izumi ............... G02B 13/14
                                             359/356

FOREIGN PATENT DOCUMENTS

CN   210090811    2/2020
EP     2034344    3/2009
(Continued)

OTHER PUBLICATIONS

Le Gac David et al., "FLIR One $2^{nd}$ Gen. & Lepton 3 LWIR Module—Vox Microbolometer 160x120 Resolution—12 um," Feb. 3, 2016, pp. 1-26, https://s3.1-micronews.com/uploads/2019/02/FLIR_One_2nd_Generation_LEPTON_3_February_2016_Flyer_Sample.pdf.
Anonymous "FLIR Lepton Engineering Datasheet," Mar. 21, 2018, pp. 1-83, https://cdn.sparkfun.com/assets/1/6/3/4/c/Lepton_Engineering_Datasheet_Rev200.pdf.
(Continued)

*Primary Examiner* — Masum Billah
(74) *Attorney, Agent, or Firm* — Haynes and Boone, LLP

(57) ABSTRACT

Imager optical systems and methods are provided. In one example, an imaging device includes a window configured to transmit electromagnetic radiation associated with a scene. The imaging device further includes a lens system. The lens system includes a first lens element configured to receive the electromagnetic radiation from the window and transmit the electromagnetic radiation. An aperture stop is positioned between the window and a surface of the first lens element adjacent to the window. The lens system further includes a second lens element adjacent to the first lens element and configured to receive the electromagnetic radiation and direct the electromagnetic radiation to the detector array. The imaging device further includes a detector array including detectors. Each detector is configured to receive the electromagnetic radiation from the lens system and generate a thermal image based on the electromagnetic radiation. Related methods and systems are also provided.

20 Claims, 9 Drawing Sheets

Related U.S. Application Data

(60) Provisional application No. 63/083,765, filed on Sep. 25, 2020.

(51) Int. Cl.
*G02B 7/02* (2021.01)
*G06V 20/56* (2022.01)

(58) Field of Classification Search
CPC ... G02F 1/133371; G02F 1/291; G02B 30/00; G02B 27/106
USPC .......................................................... 348/164
See application file for complete search history.

(56) References Cited

FOREIGN PATENT DOCUMENTS

| | | | |
|---|---|---|---|
| EP | 2175299 | 4/2010 | |
| WO | WO 2012015965 | 2/2012 | |
| WO | WO-2018232185 A1 * | 12/2018 | ....... B29D 11/00432 |

OTHER PUBLICATIONS

Anonymous "SystemPlus Publishes FLIR Lepton Reverse Engineering," Image Sensors World, Dec. 10, 2014, pp. 1-9, http://image-sensors-world.blogspot.com/2014/12/systemplus-publishes-flir-lepton.html.

\* cited by examiner

IMAGER OPTICAL SYSTEMS AND METHODS

CROSS-REFERENCE TO RELATED APPLICATIONS

This application is a continuation of International Patent Application No. PCT/US2021/051572 filed Sep. 22, 2021 and entitled "IMAGER OPTICAL SYSTEMS AND METHODS," which claims priority to and the benefit of U.S. Provisional Patent Application No. 63/083,765 filed Sep. 25, 2020 and entitled "IMAGER OPTICAL SYSTEMS AND METHODS," all of which are incorporated herein by reference in their entirety.

TECHNICAL FIELD

One or more embodiments relate generally to optical components for imaging and more particularly, for example, to imager optical systems and methods.

BACKGROUND

Imaging systems may include an array of detectors, with each detector functioning as a pixel to produce a portion of a two-dimensional image. In some cases, imaging systems may include one or more optical elements (e.g., lenses, mirrors) to facilitate imaging applications, such as by directing light to the array of detectors. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, an imaging device includes a window configured to transmit electromagnetic radiation associated with a scene. The imaging device further includes a lens system. The lens system includes a first lens element configured to receive the electromagnetic radiation from the window and transmit the electromagnetic radiation. An aperture stop is positioned between the window and a surface of the first lens element adjacent to the window. The lens system further includes a second lens element adjacent to the first lens element and configured to receive the electromagnetic radiation and direct the electromagnetic radiation to the detector array. The imaging device further includes a detector array including detectors. Each detector is configured to receive the electromagnetic radiation from the lens system and generate a thermal image based on the electromagnetic radiation.

In one or more embodiments, a method includes transmitting, by a window, electromagnetic radiation associated with a scene. The method further includes directing, by a lens system including a first lens element adjacent to the window and a second lens element adjacent to the first lens element, the electromagnetic radiation to a detector array. An aperture stop is positioned between the window and a surface of the first lens element adjacent to the window. The method further includes receiving, by the detector array, the electromagnetic radiation and generating, by the detector array, a thermal image based on the electromagnetic radiation.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
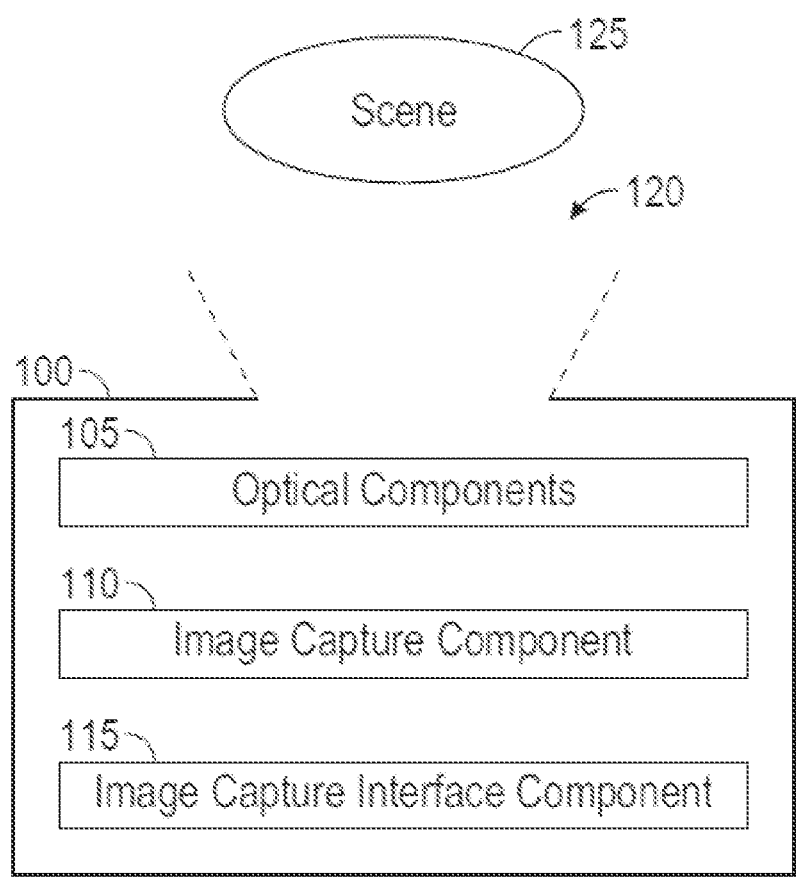
FIG. 1 illustrates a block diagram of an imaging device in accordance with one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, imager optical systems and methods are provided. In some aspects, such systems and methods may be used for infrared imaging, such as thermal infrared imaging. Such imaging (e.g., infrared imaging) may be used for various applications, such as functional safety and vehicular (e.g., automotive) applications. In one embodiment, an imaging device includes a detector array and an optical element(s) to direct electromagnetic radiation associated with a scene to the detector array. By way of non-limiting examples, an optical element may include a window, a lens, a mirror, a beamsplitter, a beam coupler, and/or other component. In an aspect, the imaging device includes a window and a lens system including at least two lens elements. In some cases, the imaging device may also include other optical elements upstream of the window and/or the lens elements, downstream of the window and/or the lens elements, and/or interspersed between the window and the lens elements and/or between two lens elements.

The window may be placed in front of the lens system and thus closer to a scene than the lens system. In an aspect, a scene may be referred to as an object, a target scene, or a target object. The window may protect the lens system and/or other components (e.g., other components behind the window) of the imaging device from environmental damage, mechanical damage, and/or other damage, thus facilitating enhanced reliability of the imaging device. The window may transmit electromagnetic radiation for receipt by the lens system. The lens system may receive the electromagnetic radiation and direct the electromagnetic radiation to the detector array. In this regard, for a given lens element of the lens system, the lens element may receive electromagnetic radiation associated with a portion of the scene and may transmit the electromagnetic radiation. In a case the imaging device includes a series of lens elements, each lens element may receive and direct electromagnetic radiation to a next lens element of the series, with a last lens element receiving and directing electromagnetic radiation to the detector array. In some applications, at least one of the lens elements in the series refracts electromagnetic radiation.

The detector array may receive electromagnetic radiation directed (e.g., projected, transmitted) by the lens element(s) onto the detector array. In this regard, the electromagnetic radiation may be considered image data. The detector array may generate an image based on the electromagnetic radiation.

The window and the lens element(s) of the imaging device may be transmissive of electromagnetic radiation within a waveband dependent on a desired application. In an aspect, the imaging device may be an infrared imaging device for facilitating capture of a waveband encompassing at least a portion of the thermal infrared spectrum, such as a mid-wave infrared spectrum and/or a long-wave infrared spectrum. In infrared imaging applications, the detector array may include an array of microbolometers and/or an array of other types of infrared detectors. As non-limiting examples, a window may include silicon and/or zinc blende (ZnS). As non-limiting examples, a lens element may include silicon, germanium, chalcogenide glass (e.g., $As_{40}Se_{60}$), germanium arsenide selenium (GeAsSe), $Ge_{22}As_{20}Se_{58}$, and/or $Ge_{33}As_{12}Se_5$. Window material and lens material used to manufacture the window and the lens element(s), respectively, are generally based on a desired application. For example, window material may be of sufficient hardness to protect components of the imaging device, such as the lens elements. For example, window material and lens material may be selected to allow a desired transmission waveband of the window and the lens elements.

In various embodiments, an aperture stop (e.g., also referred to as a stop or a limiting aperture) may be positioned/defined between the window and a front side of a lens system facing the window. For example, in a two-lens system, the lens system has a front lens element and a rear lens element behind the front lens element (e.g., farther from the window than the front lens element), and the aperture stop may be provided by a front side of the front lens element. In this example, the window, the front lens element, and the rear lens element may collectively provide an optical system. By providing the aperture stop at the front, the optical system may be shrunk in both axial and lateral directions relative to a case in which the aperture stop is positioned/defined behind the front lens element. In this regard, by providing the aperture stop at the front, the window may have a smaller outer perimeter (e.g., a smaller outer diameter (OD) for a circular window) and thickness, thus allowing for a reduced impact of the window on the imaging device's signal-to-noise ratio (SNR) relative to a case in which the window has a larger outer perimeter and/or larger thickness. Thus, various embodiments provide optical and mechanical design that allow for achieving miniaturization requirements while providing a wide field of view and/or cost effective and/or interchangeable lens assembly. Various vehicle design rules (e.g., stylistic vehicle design rules), device integration requirements (e.g., cell phone integration), etc. may involve miniaturization requirements. In some cases, lens elements and/or other optical elements may be formed with appropriate compactness for integration into a camera module (e.g., of a mobile phone).

In some aspects, the miniaturized size of the window may allow integration of the window into a lens barrel assembly. In some cases, integration of the window into the lens barrel assembly may allow more cost-effective assembly processes in which windows can be placed using high throughput pick and place machinery and/or enable full system calibration at the factory. The full system calibration allows calibration to be performed at the factory for the optical system including the window and lens elements. In this regard, the calibration may be performed in relation to a whole optical path from the window to the detector array. Such full system calibration is in contrast to a case in which the window is separate from the lens elements and thus the lens elements are calibrated without the window at the factory. On the user's end (e.g., customer's end), the window may then be added to the factory/manufacturer calibrated optical system and a calibration of this adjusted optical system performed.

Such full system calibration allows the optical system including the window and the lens(es) to be calibrated together and packaged into an imaging device. A user may be able to use the imaging device without recalibrating the imaging device (e.g., in contrast with a case in which the window is separate from the imaging device and recalibration is needed when the window is introduced and disposed in front of the lens element(s) of the imaging device). With the window and the lens(es) packaged into imaging devices, an imaging device may be readily interchanged with other imaging devices (e.g., without additional calibration and/or setup), such as when a potential error is detected in the imaging device or otherwise when a user is replacing the imaging device. For example, in automobile applications, the imaging device may be interchangeable on a vehicle. Such interchangeability may simplify serviceability and vehicle maintenance procedures. For example, one imaging device may be replaced with another without the user needing to perform recalibration to operate the newly installed imaging device. In one aspect, the imaging device may be mounted on the vehicle (e.g., a roof of the vehicle) and used to facilitate automatic emergency braking (AEB). The imaging device may have imaging capability appropriate to enhance vehicle detection performance of pedestrians, animals, and/or other objects. In one case, the imaging device may include an uncooled thermal camera. In one example embodiment, in automotive imaging applications, an imaging device having a panoramic field of view may be desired. For example, the imaging device may include a front looking camera.

The imaging device may include a lens barrel (e.g., also referred to as a lens housing) to hold (e.g., receive, secure, align) the window and the lens elements. The imaging device may include a housing coupled to the lens barrel. The housing may include (e.g., enclose) the detector array. In some cases, the housing may include a processor to process image data from the detector array, memory to store raw image data and/or processed image data, a battery, and/or other components to facilitate operation of the imaging device.

In some embodiments, each optical element (e.g., lens element, window) may include at least one mating feature (e.g., also referred to as a mounting feature). The lens barrel may have a corresponding mating feature(s) that couples to a mating feature(s) of the optical element(s) to receive and secure the optical element(s). In this regard, each mating feature of an optical element may couple to a corresponding mating feature of the lens barrel to couple the optical element to the lens barrel. In one example, a mating feature of an optical element may include a first surface and a second surface at an angle (e.g., 90° angle, obtuse angle, or acute angle) relative to the first surface, and a mating feature of a lens barrel may have corresponding surfaces to couple to the first and second surfaces. In another example, a mating feature of an optical element may include a pin portion, and a mating feature of a lens barrel may include a slot portion to receive the pin portion, and/or vice versa. More generally, a mating feature(s) of an optical element and a corresponding mating feature(s) of a lens barrel may be any structure (e.g., indentation, hole, pin, or other structure) that facilitates coupling of the optical element to the lens barrel.

In some cases, a mating feature of a lens element may be appropriate to facilitate rotation and/or other movement of the lens element. In some cases, a mating feature may be utilized to facilitate alignment of a lens element, such as via pattern recognition during molding, machining, and/or assembling. For example, one or more mating features on a surface of a lens element can be located (e.g., using pattern recognition to scan the surface) to facilitate machining of a different surface of the lens element according to a desired design. As another example, a mating feature(s) of a surface(s) of a first lens element and/or a mating feature(s) of a surface(s) of a second lens element may be utilized to facilitate alignment of the first lens element relative to the second lens element.

By contrast, conventional lens systems have a large front lens element with an aperture stop placed behind the front lens element. The large front lens element requires a window having large lateral dimensions in order to allow a wide field of view. Furthermore, the window has to be relatively thick to maintain a mechanically stable aspect ratio while protecting the front lens element. Cost effective windows are generally made of materials having sufficient hardness, such as silicon or ZnS. Absorption of long-wave infrared (LWIR) (7-14 µm) radiation in these materials are directly proportional to a thickness of the material. As such, a thicker window is associated with higher and thus a degradation of the imaging device's SNR.

FIG. 1 illustrates a block diagram of an imaging device 100 in accordance with one or more embodiments of the disclosure. In an embodiment, the imaging device 100 may be an infrared imaging device. The imaging device 100 may be used to capture and process image frames. The imaging device 100 includes optical components 105, an image capture component 110, and an image capture interface component 115.

The optical components 105 may receive electromagnetic radiation through an aperture 120 of the imaging device 100 and pass the electromagnetic radiation to the image capture component 110. For example, the optical components 105 may direct and/or focus electromagnetic radiation on the image capture component 110. The optical components 105 may include one or more windows, lenses, mirrors, beamsplitters, beam couplers, and/or other components. In an embodiment, the optical components 105 may include one or more chalcogenide lenses, such as lenses made of $As_{40}Se_{60}$, that allow for imaging in a wide infrared spectrum. Other materials, such as silicon, germanium, and GeAsSe, may be utilized. The optical components 105 may include components each formed of material and appropriately arranged according to desired transmission characteristics, such as desired transmission wavelengths and/or ray transfer matrix characteristics.

The image capture component 110 includes, in one embodiment, one or more sensors (e.g., visible-light sensor, infrared sensor, or other type of detector) for capturing image signals representative of an image of a scene 125. The image capture component 110 may capture (e.g., detect, sense) infrared radiation with wavelengths in the range from around 700 nm to around 1 mm, or portion thereof. For example, in some aspects, the image capture component 110 may include one or more sensors sensitive to (e.g., better detect) thermal infrared wavelengths, including mid-wave infrared (MWIR) radiation (e.g., EM radiation with wavelength of 2-7 µm) and/or LWIR radiation (e.g., electromagnetic radiation with wavelength of 7-14 µm). In one embodiment, the sensor(s) of the image capture component 110 may represent (e.g., convert) or facilitate representation of a captured thermal image signal of the scene 125 as digital data (e.g., via an analog-to-digital converter).

The image capture interface component 115 may receive image data captured at the image capture component 110 and may communicate the captured image data to other components or devices, such as via wired and/or wireless communication. In various embodiments, the imaging device 100 may capture image frames, for example, of the scene 125.

In some embodiments, the optical components 105, image capture component 110, and image capture interface component 115 may be housed in a protective enclosure. In one case, the protective enclosure may include a lens barrel (e.g., also referred to as a lens housing) that houses the optical components 105 and a housing that houses the image capture component 110 and/or the image capture interface component 115. In this case, the lens barrel may be coupled to the housing. In an aspect, the protective enclosure may be represented by the solid-line box in FIG. 1 having the aperture 120. For example, the aperture 120 may be an opening defined in the protective enclosure that allows electromagnetic radiation to reach the optical components 105. In some cases, the aperture 120 may be an aperture stop of the imaging device 100.

The imaging device 100 may represent any type of camera system which, for example, detects electromagnetic radiation (e.g., thermal radiation) and provides representative data (e.g., one or more still image frames or video image frames). For example, the imaging device 100 may be configured to detect visible light and/or infrared radiation and provide associated image data. In some cases, the imaging device 100 may include other components, such as a shutter, a heater, a temperature sensor (e.g., for measuring an absolute temperature of a component of the imaging device 100), a filter, a polarizer, and/or other component. For example, a shutter between a window and a lens may be used to facilitate image capture and calibration. For example, an integrated heater may be coupled to the barrel of the imaging device 100.

Figure 2:
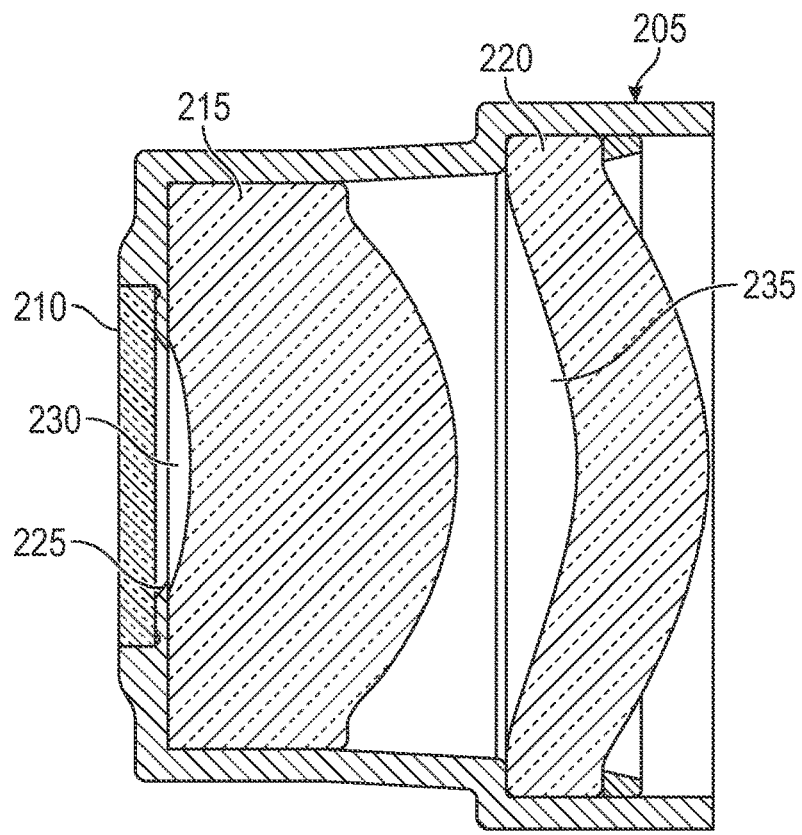
FIG. 2 illustrates a cross-sectional view of a lens barrel of an imaging device and components therein in accordance with one or more embodiments of the disclosure.

FIG. 2 illustrates a cross-sectional view of a lens barrel 200 of an imaging device and components therein in accordance with one or more embodiments of the disclosure. The imaging device also may include an image capture component that can capture images viewed through the lens barrel 205. As one example, the imaging device may be an LWIR thermal camera (e.g., for capturing electromagnetic radiation with wavelengths of 7-14 µm). In other cases, the imaging device may be utilized to capture electromagnetic radiation within other wavelength ranges.

The lens barrel 205 accommodates a window 210 and lens elements 215 and 220. The lens barrel 205 may include structure to hold/secure (e.g., fixedly secures, movably secures) the optical element window 210, the lens element 215, and/or the lens element 220. For example, in FIG. 2, the window 210 has a circular shape that is received by a circular aperture of the lens barrel 205. Windows and/or apertures of other shapes, such as rectangular, may be used. It is noted that the window 210, the lens element 215, and/or the lens element 220 may be of a different shape from that shown in FIG. 2. In an embodiment, the lens barrel 205 may be the lens barrel of the imaging device 100 of FIG. 1. In this embodiment, the optical components 105 of FIG. 1 may include the window 210 and the lens elements 215 and 220.

The window 210 may selectively pass electromagnetic radiation of the scene. In some cases, the window 210 may be a protective window placed in front of the lens elements 215 and 220 to protect the lens elements 215 and 220 and/or other components of the imaging device from environmental damage, mechanical damage, and/or other damage. Physical properties (e.g., material composition, thickness and/or other dimensions, etc.) of the window 210 may be determined based on a waveband(s) desired to be transmitted through the window 210.

The lens elements 215 and 220 may coordinate to direct and focus infrared light onto the image capture component. An aperture stop 225 (e.g., also referred to as a stop or a limiting aperture) associated with a lens system including the lens elements 215 and 220 defines an amount of light that is transmitted into the imaging device. The aperture stop 225 may have spatial dimensions comparable to spatial dimensions of a front optical surface of the lens element 215. In FIG. 2, the aperture stop 225 is defined/positioned between the window 205 and a front side/surface of the lens element 215. In some cases, the aperture stop 225 may be defined by physical properties of a structure that holds (e.g., fixedly secures, movably secures) the lens element 215. The structure may be formed of metal or generally any material appropriate to hold/secure the lens element 215. In some aspects, as shown in FIG. 2, one or more coatings 230 may be disposed on the lens element 215 and/or one or more coatings 235 may be disposed on the lens element 220. By way of non-limiting examples, a coating may be an anti-reflective (AR) coating, a polarization coating, impact-resistant coating, and/or other coating.

In one embodiment, the image capture component may include arrays of microbolometers to detect electromagnetic radiation. As one example, the arrays of microbolometers may be configured to detect long-wave infrared light of wavelengths between 7.5 µm and 13.5 µm. One or both of the lens elements 215 and 220 may be lenses that transmit a wide spectrum of infrared light, such as chalcogenide lenses.

Figure 3:
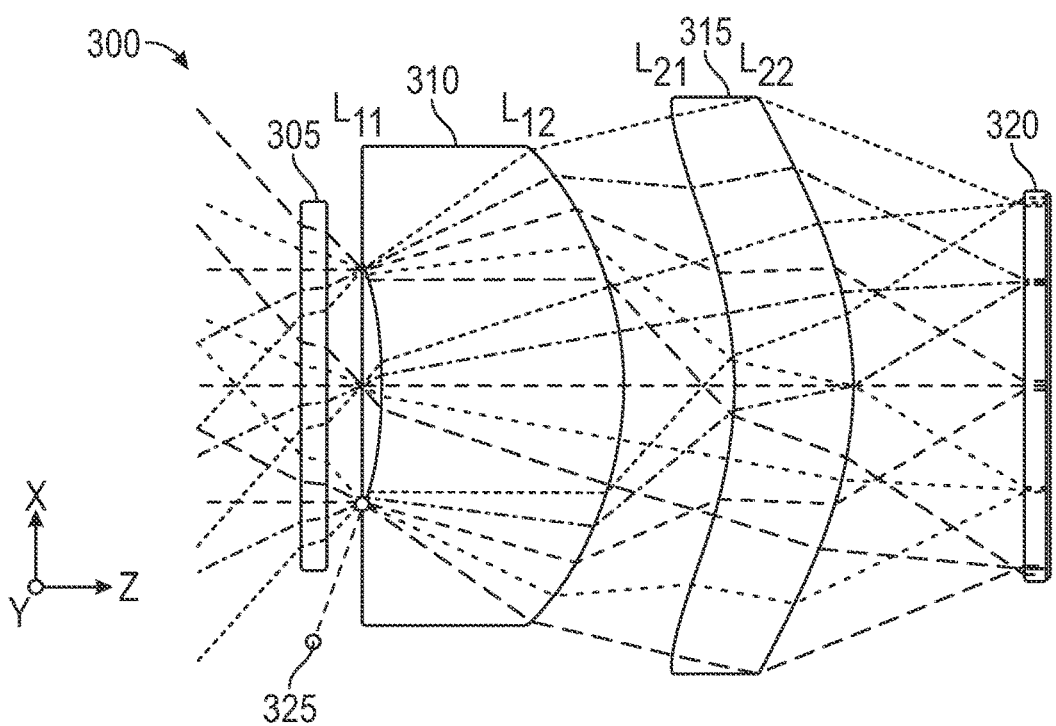
FIG. 3 illustrates a cross-sectional view of an optical system in accordance with one or more embodiments of the disclosure.

FIG. 3 illustrates a cross-sectional view of an optical system 300 in accordance with one or more embodiments of the disclosure. The optical system 300 is oriented along three orthogonal directions, denoted as X, Y, and Z. The X-direction and the Y-direction may be referred to as the horizontal direction and the vertical direction, respectively. In particular, FIG. 3 illustrates a cross-sectional view of the optical system 300 in the XZ-plane. The optical system 300 includes a window 305, lens elements 310 and 315, and a detector array 320. An aperture stop 325 is positioned/defined in front of the lens element 310 and behind the window 305. In an aspect, the lens element 310 and/or 315 may be made of chalcogenide glass (e.g., IG6 chalcogenide glass). In an embodiment, the optical components 105 of FIG. 1 may include the window 305 and the lens elements 310 and 315, and the image capture component 110 of FIG. 1 may include the detector array 320.

The aperture stop 325 defines an amount of light that is transmitted into the optical system 300. The aperture stop 325 may have spatial dimensions comparable to spatial dimensions of a front optical surface of the lens element 310. In some cases, the aperture stop 325 may be the same or substantially the same in size and shape as a clear aperture of the lens element 310. The aperture stop 325 may be defined by physical properties of the lens element 310, such as a size, shape, and material of the front surface of the lens element 310, and physical properties of a structure that holds the lens element 310. For instance, the structure may be a part of a lens barrel (e.g., the lens barrel 200). In one case, the structure may be a metal structure at least partially in front of the lens element 310. As one example, the structure may be a metal structure that has a shape that conforms to the front surface of the lens element 310.

The window 305 may selectively pass electromagnetic radiation of a scene toward the lens element 310. In some cases, the window 305 may be a protective window placed in front of the lens elements 310 and 315 to protect the lens elements 310 and 315 and/or other components from environmental damage, mechanical damage, and/or other damage. Physical properties (e.g., material composition, thickness and/or other dimensions, etc.) of the window 305 may be determined based on a waveband(s) desired to be transmitted through the window 305. In some cases, the window 305 may be used to provide filtering, polarization, and/or other optical effects in addition to protection. In some cases, one or more coatings (e.g., polarization coating, AR coating, impact-resistant coating) may be disposed on the window 305 to provide the filtering, polarization, protection, and/or other effects.

Although the window 305 of the optical system 300 of FIG. 3 is planar and parallel or substantially parallel to the detector array 320, an optical system may include a slanted, curved, non-planar, and/or other shaped and/or oriented window. As one example, a curved window may facilitate sliding of water, snow, and/or other object off the window and/or to provide beneficial aerodynamic properties. In one aspect, a curved window may be formed of a hydrophobic material and/or have a hydrophobic coating disposed thereon to further facilitate with the sliding of water and/or snow. In one aspect, a slanted window and/or other appropriately shaped and/or arranged window may be used to allow beneficial aerodynamic properties of the window and/or sliding of objects off the window, such as for a window of a camera installed on a vehicle (e.g., car, aerial vehicle, etc.).

The lens element 310 receives the electromagnetic radiation and directs the received electromagnetic radiation to the lens element 315. The lens element 315 receives the electromagnetic radiation from the lens element 310 and directs the electromagnetic radiation received from the lens element 310 to the detector array 320. As such, the lens elements 310 and 315 collectively projects the scene onto the detector array 320. In this regard, FIG. 3 illustrates at least a portion of the scene ray traced through the window 305 and the lens elements 310 and 315 to the detector array 320. Examples of materials of the lens elements 310 and 315 may include $As_{40}Se_{60}$, $Ge_{22}As_{20}Se_{58}$, $Ge_{33}As_{12}Se_5$, germanium, and silicon. An example range of a central lens thickness of the lens elements 310 and 315 is around 1 mm to around 15 mm. An example range of a clear aperture of the lens elements 310 and 315 is around 3 mm to around 40 mm. The detector array 320 receives the electromagnetic radiation and generates an image based on the electromagnetic radiation. In an aspect, the image may be processed using processing circuitry downstream of the detector array 320. As non-limiting examples, the detector array 320 may have a size of 640×512 sensors (e.g., 640×512 array of microbolometers), 320×256 sensors, and 1280×1024 sensors. An example range of f-numbers for the optical system 300 may be around 0.85 to around 1.5. An example range of horizontal fields of view for the optical system may be around 36° to around 120°. An example aspect ratio of the window 305 is 9.5 mm outer diameter×0.5 mm thick window (e.g., a 9.5:1 aspect ratio). Another example aspect ratio of the window 305 is 9.5 mm outer diameter×0.5 mm thick window (e.g., a 20:1 aspect ratio). Dependent on application, windows associated with lower or higher aspect ratios may be used. In general, lower aspect ratios may be associated with higher strength (e.g., improve resistance to failure due to applied forces).

In an embodiment, to facilitate alignment of a horizontal field of view with the horizontal direction of the detector array 320 and a vertical field of view with the vertical direction of the detector array 320, one or both of the lens elements 310 and 315 can be moved relative to the detector array 320. In some aspects, the lens elements 310 and/or 315 may be moved via sliding motion (e.g., translational motion) to facilitate focusing, such as by using one or more actuators coupled to the lens elements 310 and/or 315. In one case, the sliding motion may be along the Z-axis (e.g., the direction perpendicular to a focal plane) while preserving a fixed angular orientation. In these aspects, a focusing mechanism of the lens elements 310 and/or 315 may include components (e.g., actuators) for moving the lens elements 310 and/or 315. In one case, a rotation about the Z-axis may be constrained within an alignment tolerance between the major FOV associated with the lens elements 310 and 315 and the corresponding major dimension (e.g., X-dimension) of the detector array 320 and/or constrained within an alignment tolerance between the minor FOV associated with the lens elements 310 and 315 and the minor dimension (e.g., Y-dimension) of the detector array 320. In some aspects, one or more lenses may be focused by rotating the lens(es) inside a threaded housing. In some aspects, the housing is not threaded. The housing may allow a linear slip-fit type arrangement rather than a threaded-in type arrangement, in which the window 305 and the lens elements 310 and 315 may be pushed into the housing and maintained in place using at least friction. Alternatively, some gap may be provided between the barrel and housing to allow for active alignment of the optics to the detector array 320 which is fixed in place by epoxy or other suitable adhesive.

In some embodiments, the lens elements 310 and 315 are each associated with a lens prescription. In some aspects, each prescription may be expressed according to the following:

$$Z = \frac{cS^2}{1 + \sqrt{1 - (K+1)c^2S^2}} + A_1S^4 + A_2S^6 + A_3S^8 + A_4S^{10} + \ldots + A_{12}S^{26}$$

where $S = x^2 + y^2$; $c = 1/r$;

r is the radius of curvature; $A_1, A_2, A_3, A_4, \ldots, A_{12}$ are aspheric deformation constants; and K is the conic constant.

Table 1 illustrates example values of various parameters of the optical system 300.

|  | Lens Element 310 | | Lens Element 315 | |
| --- | --- | --- | --- | --- |
| Surface | Surface $L_{11}$ | Surface $L_{12}$ | Surface $L_{21}$ | Surface $L_{22}$ |
| Central thickness [mm] | 7.002 | | 3.458 | |
| c [mm$^{-1}$] | −6.668E−02 | −1.158E−01 | −1.077E−01 | −1.102E−01 |
| K | −1 | −1 | −1 | −1 |
| $A_1$ [mm$^{-3}$] | −1.625E−03 | −9.939E−05 | 4.343E−04 | 2.205E−04 |
| $A_2$ [mm$^{-5}$] | 8.791E−05 | −3.964E−06 | −6.851E−07 | −2.423E−06 |
| $A_3$ [mm$^{-7}$] | −1.857E−05 | 1.547E−07 | −5.203E−08 | 7.179E−08 |
| $A_4$ [mm$^{-9}$] | 1.224E−06 | −4.954E−09 | 6.347E−10 | −1.613E−09 |
| $A_5$ [mm$^{-11}$] | −3.083E−08 | 5.834E−11 | 2.793E−12 | 1.378E−11 |
| Diffractive coefficient $p_2$ | n/a | −7.095E−01 | n/a | n/a |
| Clear aperture | 6.640 | 12.920 | 14.920 | 15.600 |

Figure 4:
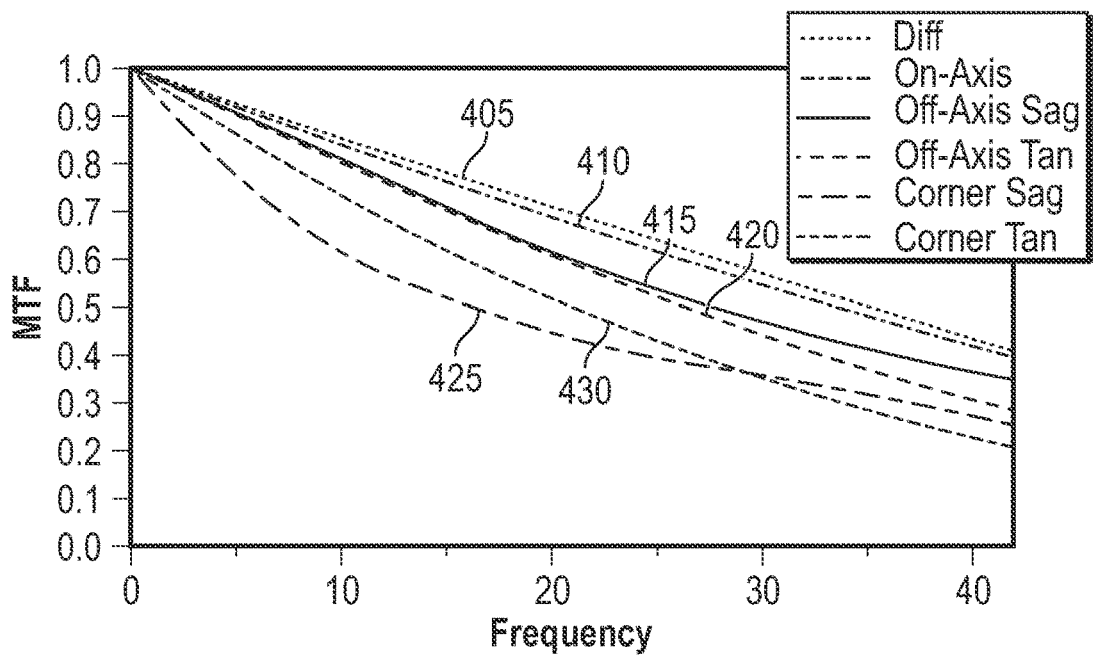
FIG. 4 illustrates an example graph showing a modulation transfer function as a function of frequency for an optical system in accordance with one or more embodiments of the disclosure.

FIG. 4 illustrates an example graph showing a modulation transfer function (MTF) as a function of frequency for the optical system 300 having the lens elements 310 and 315 implemented with the parameters shown in Table 1 in accordance with one or more embodiments of the disclosure. As examples, the optical system 300 may have a horizontal field of view of 70°, an f-number of 1, and a distortion of −26%. FIG. 4 provides curves 405, 410, 415, 420, 425, 430, and 435.

Figure 5:
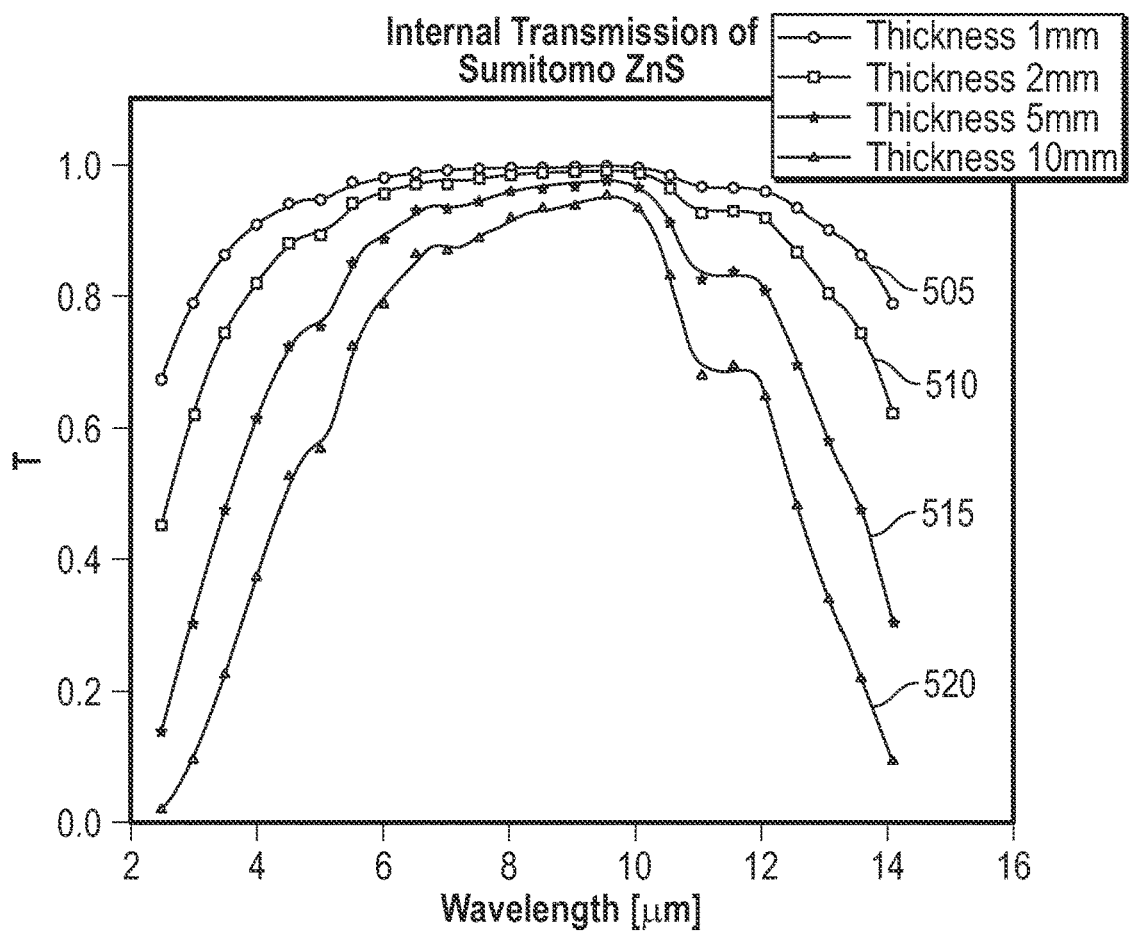
FIG. 5 illustrates an example graph showing transmission spectra of a window.

In various embodiments, by providing a limiting aperture at a front lens element, the window may have a smaller outer circumference and thickness, thus allowing for a reduced impact of the window on the imaging device's SNR relative to a case in which the window has a larger outer circumference and/or larger thickness. Absorption of LWIR radiation in materials such as silicon or ZnS is directly proportional to a thickness of the materials. FIG. 5 illustrates an example graph showing transmission spectra for a window formed of ZnS. In this regard, FIG. 5 provides curves 505, 510, 515, and 520 associated with window thicknesses of 1 mm, 2 mm, 5 mm, and 10 mm, respectively.

Figure 6:
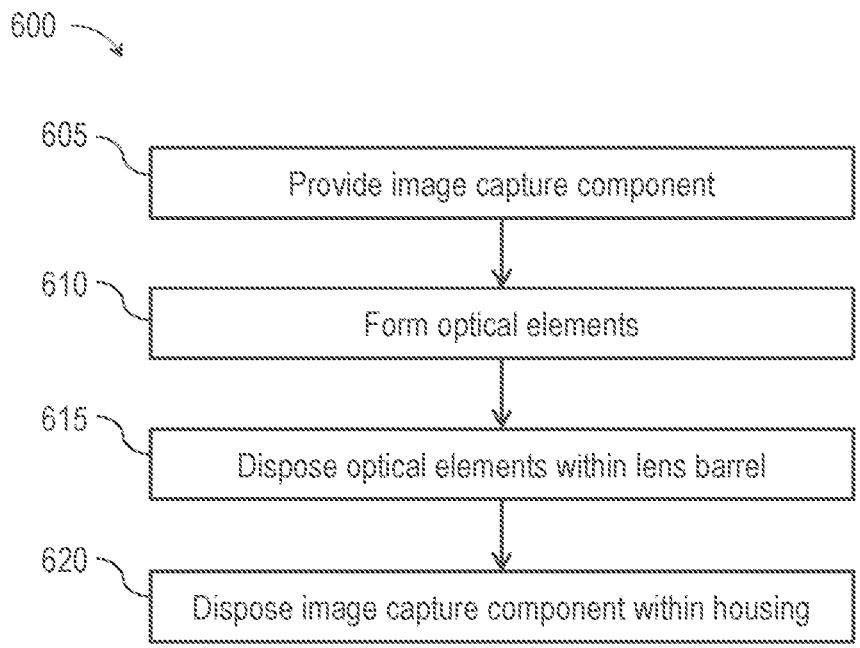
FIG. 6 illustrates a flow diagram of an example process for manufacturing an imaging device in accordance with one or more embodiments of the disclosure.

FIG. 6 illustrates a flow diagram of an example process 600 for manufacturing an imaging device in accordance with one or more embodiments of the disclosure. For explanatory purposes, the example process 600 is primarily described herein with reference to components of FIGS. 1-3 and associated arrangement of these components. However, the example process 600 is not limited to the components of FIGS. 1-3.

At block 605, the image capture component 110 is provided. At block 610, the optical components 105 are formed. The optical components 105 may include one or more windows and/or one or more lens elements. At block 615, the optical components 105 are at least partially disposed within a lens barrel (e.g., 205 of FIG. 2). In some aspects, each of the optical components may have mating features to couple to corresponding mating features of the lens barrel. At block 620, the image capture component 110 is disposed within a housing of the imaging device 100. The lens barrel may be coupled to the housing. For infrared applications, the optical components 105 (e.g., the window 210, the lens elements 215 and 220) may be formed from material that is transmissive in the 2-7 μm and/or 7-14 μm wavebands.

In one case, the lens elements 215 and 220 may be produced using wafer-level techniques. In such a case, transmissive crystalline material, such as germanium or silicon by way of non-limiting examples, may first be prepared in a wafer form. An array of lens elements (e.g., identical lens elements) may be diamond turned on one or two sides of the wafer. Machining of the array of lens elements may be on one or two sides of a wafer. In some cases, one or more mating features on a surface of a lens element can be located (e.g., using pattern recognition to scan the surface) to facilitate machining of a different surface of the lens element according to a desired design (e.g., freeform surface design). Lens elements formed as part of a wafer-level procedure may then be singulated to obtain individual lens elements that can be disposed in imaging devices. In a case that the lens elements 215 and 220 are different, the lens elements 215 and 220 may be formed as part of one wafer-level procedure (e.g., a wafer-level procedure that can be used to obtain differently shaped and/or sized lens elements) or two separate wafer-level procedures.

In one case, the lens elements 215 and 220 may be made of amorphous material. Examples of the material may include $As_{40}Se_{60}$ and GeAsSe glass. In some cases, the lens elements 215 and 220 may be diamond turned from disk-like preforms, diamond turned from near to shape ground preforms, molded from spherical performs, or molded from disk-like preforms using precision glass molding (PGM) technique. In some cases, an array of lenses can be molded simultaneously on a disk of glass.

Figure 7:
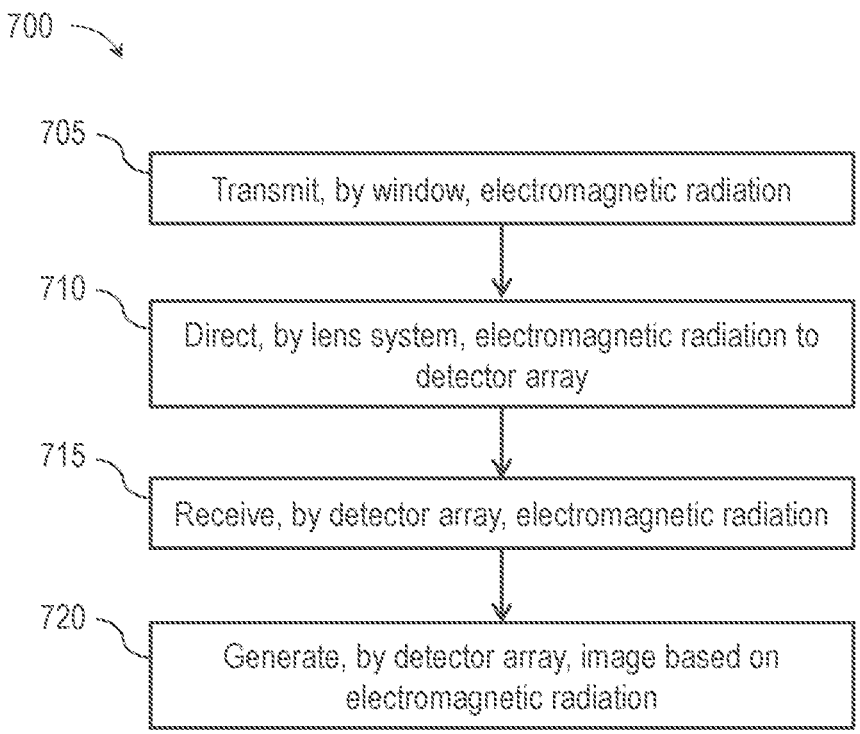
FIG. 7 illustrates a flow diagram of an example process for using an imaging device in accordance with one or more embodiments of the disclosure.

FIG. 7 illustrates a flow diagram of an example process 700 for using an imaging device in accordance with one or more embodiments of the disclosure. For explanatory purposes, the example process 700 is primarily described herein with reference to components of FIGS. 1-3 and associated arrangement of these components. However, the example process 600 is not limited to the components of FIGS. 1-3.

At block 705, the window 305 transmits electromagnetic radiation associated with a scene. At block 710, a lens system including the lens elements 310 and 315 receives the electromagnetic radiation from the window 305 and directs the electromagnetic radiation to the detector array 320. At block 715, the detector array 320 receives the electromagnetic radiation from the lens system. At block 720, the detector array 320 generates an image based on the electromagnetic radiation. In some aspects, the window 305 and the lens system may be appropriate to transmit thermal infrared radiation and the image generated by the detector array 320 may be a thermal infrared image. In some cases, the image generated by the detector array 320 may be provided for processing, storage, and/or display. For example, the image may be provided to a processor for processing to remove distortion in the image, and the processed image may then be provided for storage, display, and/or further processing.

Figure 8:
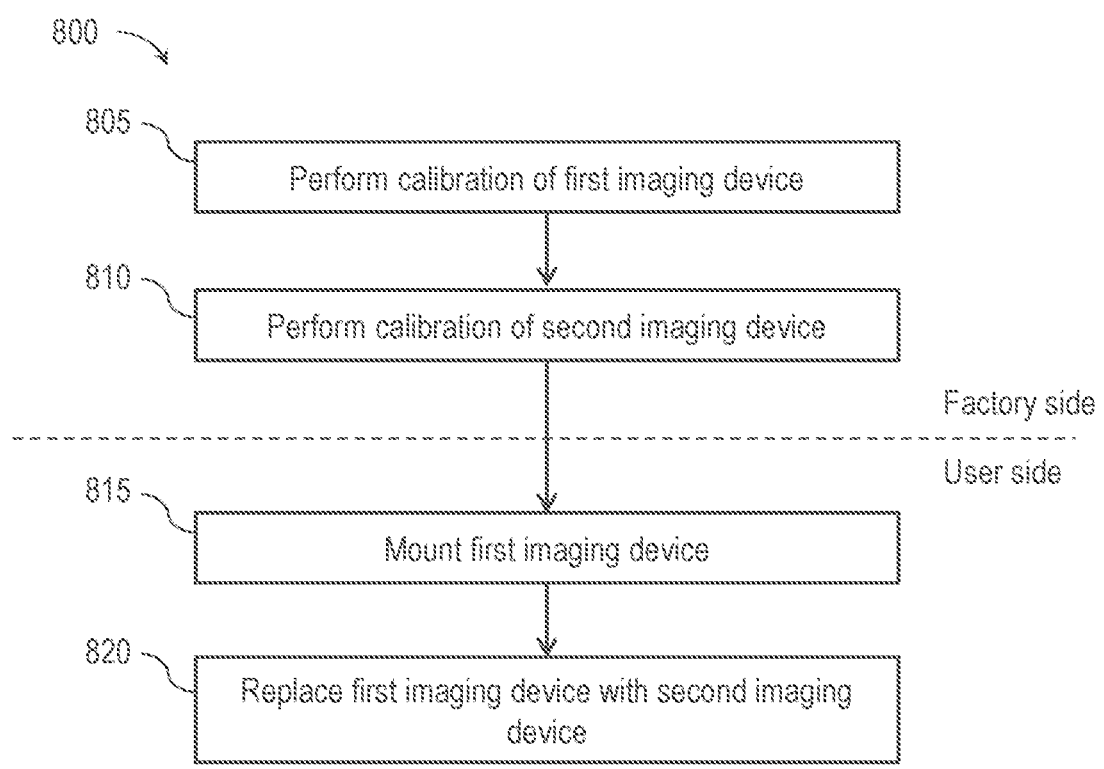
FIG. 8 illustrates a flow diagram of an example process associated with full system calibration in accordance with one or more embodiments of the disclosure.

FIG. 8 illustrates a flow diagram of an example process 800 associated with full system calibration in accordance with one or more embodiments of the disclosure. At block 805, a calibration (e.g., full system calibration) of a first imaging device is performed. The first imaging device may be a camera having a window(s) and lens element(s) integrated in the camera's lens barrel. The calibration may be performed in relation to an optical path that includes a window(s), lens element(s), and a detector array of the first imaging device. The calibration may include a shutter-based calibration (e.g., calibration based on capturing images of a shutter), a scene-based calibration, and/or other type of calibration. At block 810, a calibration (e.g., full system calibration) of a second imaging device is performed. The second imaging device may be a camera having a window(s) and lens element(s) integrated in the camera's lens barrel. The calibration may be performed in relation to an optical path that includes a window(s), lens element(s), and a detector array of the second imaging device. In one aspect, as shown in FIG. 8, the calibration of the first and second imaging devices may be performed at the factory. In this case, the first and second imaging devices may be referred to as factory calibrated imaging devices or manufacturer calibrated imaging devices.

At block 815, the first imaging device is mounted (e.g., onto a vehicle). At block 820, which may occur after a period of time after block 815 (e.g., days, weeks, months, years), the first imaging device is replaced with the second imaging device (e.g., by removing the first imaging device and mounting the second imaging device in its place). In some cases, the mounting and replacing of an imaging device may be performed by the user of the imaging devices. Thus, in various embodiments, by integrating the window(s) and the lens element(s) together in a lens barrel of an imaging device, in contrast to having separate optical elements such as separate windows, calibration of the optical elements can be performed at the factory to allow the user to use the imaging device without needing to introduce (e.g., install) additional optical elements and recalibrate the imaging device.

Although the foregoing provides a two lens system, one lens element or more than two lens elements may be utilized. In some cases, each additional lens element provided in the system allows more degrees of freedom with regard to characteristics (e.g., shape such as curvature, size) defined for each of the lens elements to achieve a desired performance. A fewer number of lens elements is generally associated with a smaller size associated with the optical system. For instance, manufacturing limitations may constrain a maximum curvature that can be manufactured for a given lens element.

Figure 9:
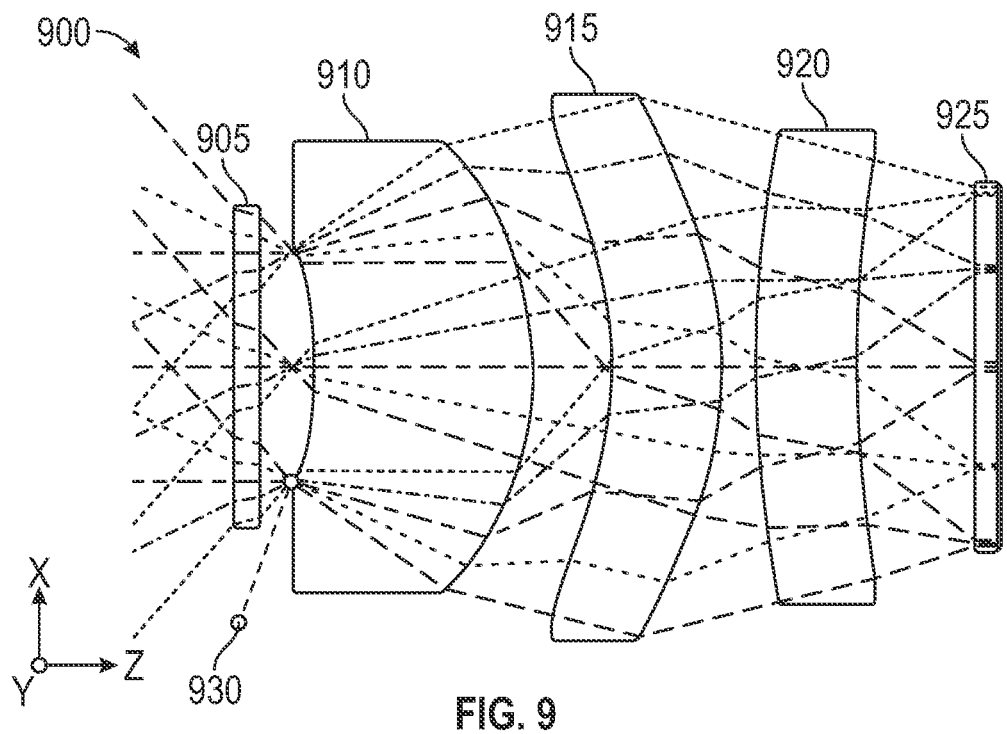
FIGS. 9 through 11 each illustrates a cross-sectional view of an optical system with three lens elements and trajectories of ray bundles through the optical system in accordance with one or more embodiments of the disclosure.

For example, FIG. 9 illustrates a cross-sectional view of an optical system 900 with three lens elements in accordance with one or more embodiments of the disclosure. The description of the optical system 300 of FIG. 3 generally applies to the optical system 900 of FIG. 9, with examples of differences and other description provided herein. The optical system 900 includes a window 905, a lens element 910 adjacent to the window 905, a lens element 915 adjacent to the lens element 910, a lens element 920 adjacent to the lens element 915, and a detector array 925 adjacent to the lens element 920. An aperture stop 930 is provided in front of the lens element 910 and adjacent to the window 905. In an embodiment, the optical components 105 of FIG. 1 may include the window 905 and the lens elements 910, 915, and 920, and the image capture component 110 of FIG. 1 may include the detector array 925.

Figure 10:
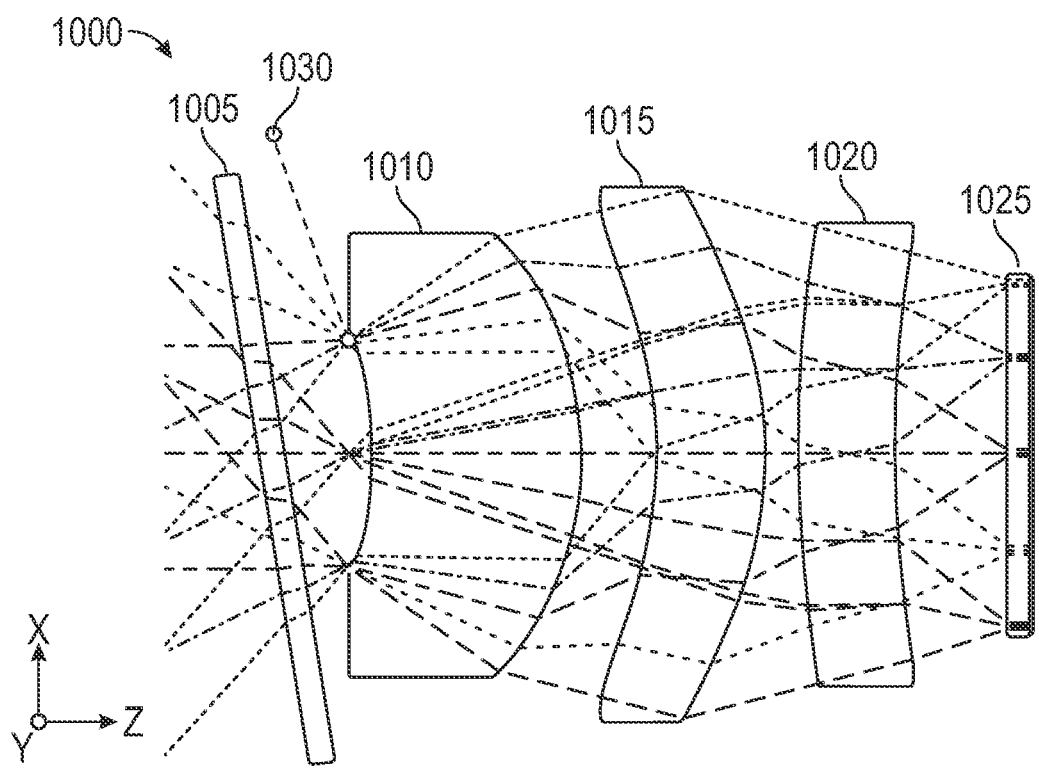

FIG. 10 illustrates a cross-sectional view of an optical system 1000 with three lens elements in accordance with one or more embodiments of the disclosure. The description of the optical system 300 of FIG. 3 generally applies to the optical system 1000 of FIG. 10, with examples of differences and other description provided herein. The optical system 1000 includes a slanted window 1005, lens elements 1010, 1015, and 1020, and a detector array 1025. An aperture stop 1030 is provided in front of the lens element 1010. In an embodiment, the optical components 105 of FIG. 1 may include the window 1005 and the lens elements 1010, 1015, and 1020, and the image capture component 110 of FIG. 1 may include the detector array 1025.

Figure 11:
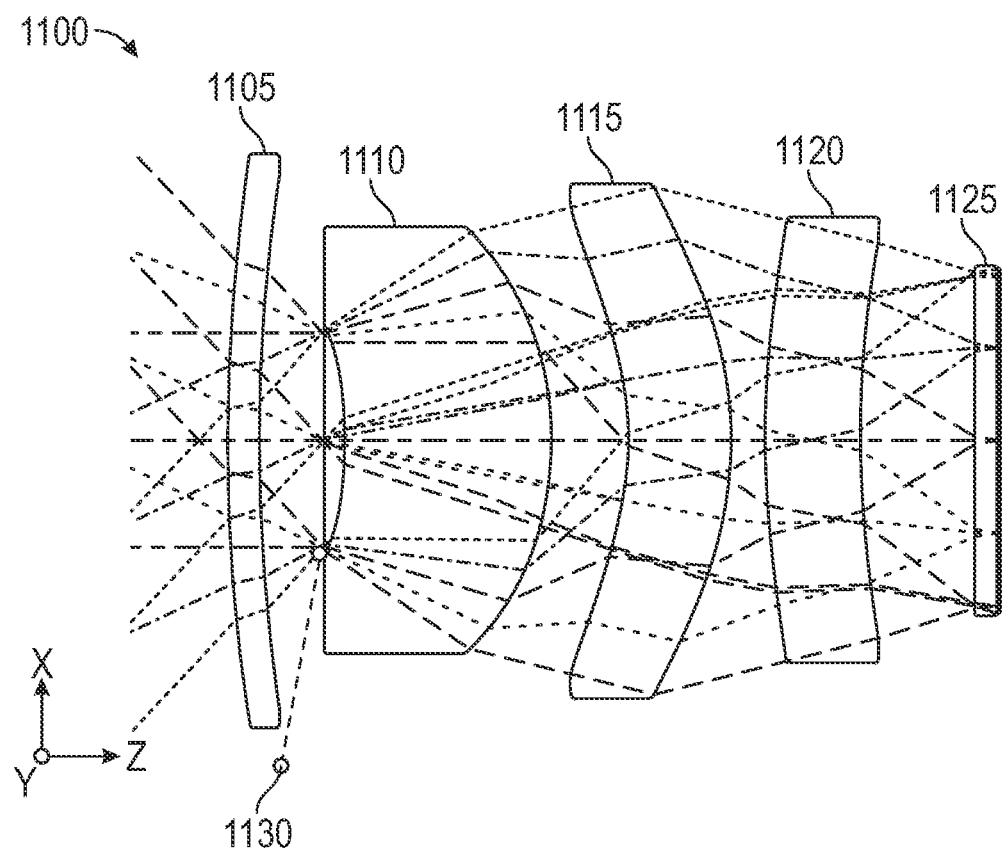

FIG. 11 illustrates a cross-sectional view of an optical system 1100 with three lens elements in accordance with one or more embodiments of the disclosure. The description of the optical system 300 of FIG. 3 generally applies to the optical system 1100 of FIG. 11, with examples of differences and other description provided herein. The optical system 1100 includes a curved window 1105, lens elements 1110, 1115, and 1120, and a detector array 1125. An aperture stop 1130 is provided in front of the lens element 1110. In an embodiment, the optical components 105 of FIG. 1 may include the window 1105 and the lens elements 1110, 1115, and 1120, and the image capture component 110 of FIG. 1 may include the detector array 1125. Although FIGS. 10 and 11 show a slanted window and a curved window, respectively, in a three-lens system, a window that is slanted, curved, and/or non-planar may be used in lens systems having fewer or more than three lens elements.

Figure 12:
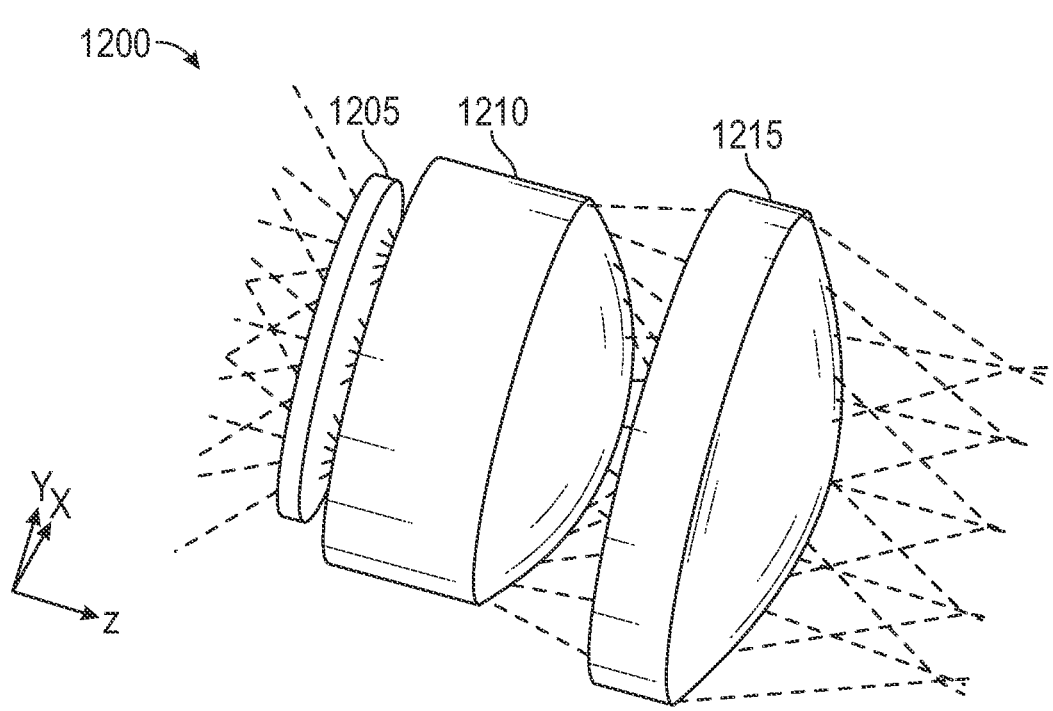
FIGS. 12 through 15 each illustrates a perspective view of an optical system and trajectories of ray bundles through the optical system in accordance with one or more embodiments of the disclosure.

FIG. 12 illustrates a perspective view of an optical system 1200 and trajectories of ray bundles through the optical system 1200 in accordance with one or more embodiments of the disclosure. The optical system 1200 is oriented along three directions X, Y, and Z. The description of the optical system 300 of FIG. 3 generally applies to the optical system 1200 of FIG. 12, with examples of differences and other description provided herein. The optical system 1200 includes a window 1205, a lens element 1210 adjacent to the window 1205, and a lens element 1215 adjacent to the lens element 1210. Electromagnetic radiation transmitted through the window 1205 is directed by the lens elements 1210 and 1215 to a detector array. An aperture stop is provided in front of the lens element 1210. In an embodiment, the optical components 105 of FIG. 1 may include the window 1205 and the lens elements 1210 and 1215.

Figure 13:
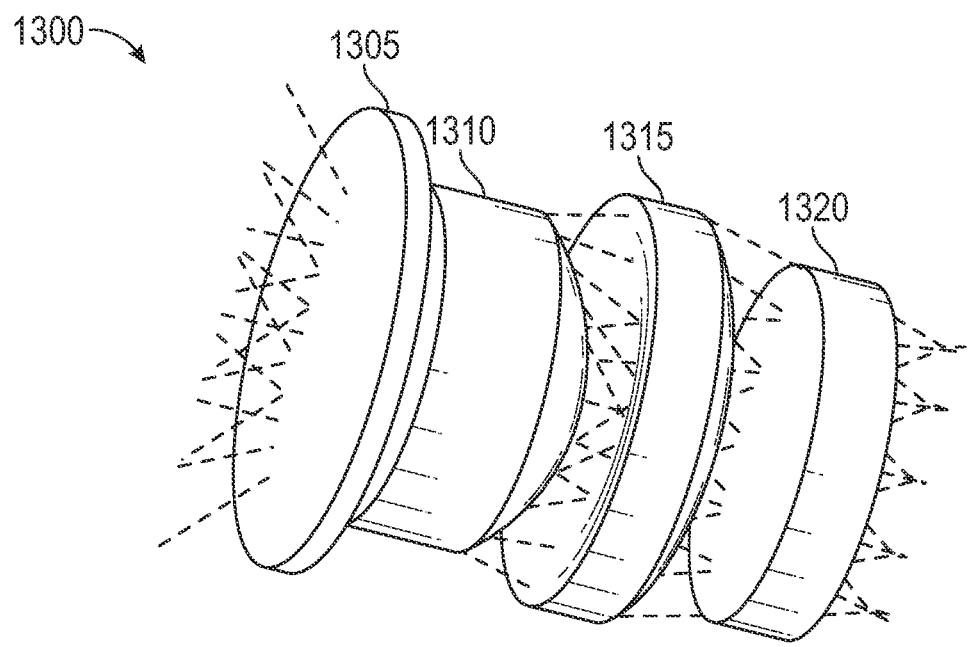

FIG. 13 illustrates a perspective view of an optical system 1300 and trajectories of ray bundles through the optical system 1300 in accordance with one or more embodiments of the disclosure. The description of the optical system 300 of FIG. 3 generally applies to the optical system 1300 of FIG. 13, with examples of differences and other description provided herein. The optical system 1300 includes a window 1305, a lens element 1310 adjacent to the window 1305, a lens element 1315 adjacent to the lens element 1310, and a lens element 1320 adjacent to the lens element 1315. Electromagnetic radiation transmitted through the window 1305 is directed by the lens elements 1310, 1315, and 1320 to a detector array. An aperture stop is provided in front of the lens element 1310. In an embodiment, the optical components 105 of FIG. 1 may include the window 1305 and the lens elements 1310, 1315, and 1320.

Figure 14:
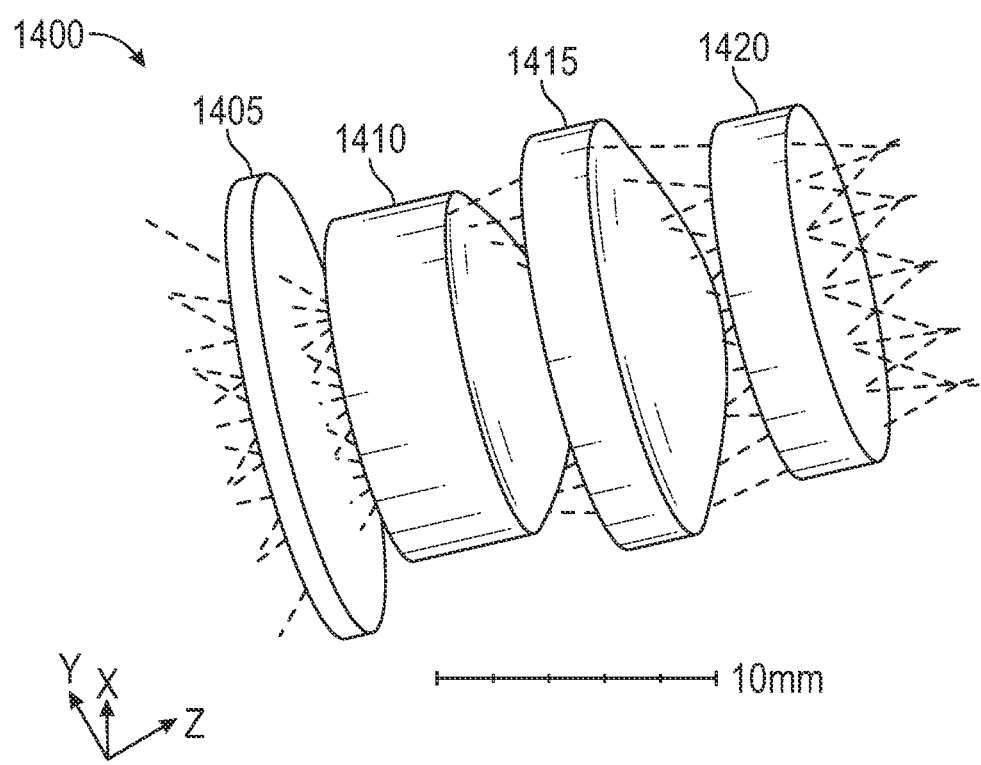

FIG. 14 illustrates a perspective view of an optical system 1400 and trajectories of ray bundles through the optical system 1400 in accordance with one or more embodiments of the disclosure. The optical system 1400 is oriented along three directions X, Y, and Z. The description of the optical system 300 of FIG. 3 generally applies to the optical system 1400 of FIG. 14, with examples of differences and other description provided herein. The optical system 1400 includes a window 1405, a lens element 1410 adjacent to the window 1405, a lens element 1415 adjacent to the lens element 1410, and a lens element 1420 adjacent to the lens element 1415. Electromagnetic radiation transmitted through the window 1405 is directed by the lens elements 1410, 1415, and 1420 to a detector array. An aperture stop is provided in front of the lens element 1410. In an embodiment, the optical components 105 of FIG. 1 may include the window 1405 and the lens elements 1410, 1415, and 1420.

Figure 15:
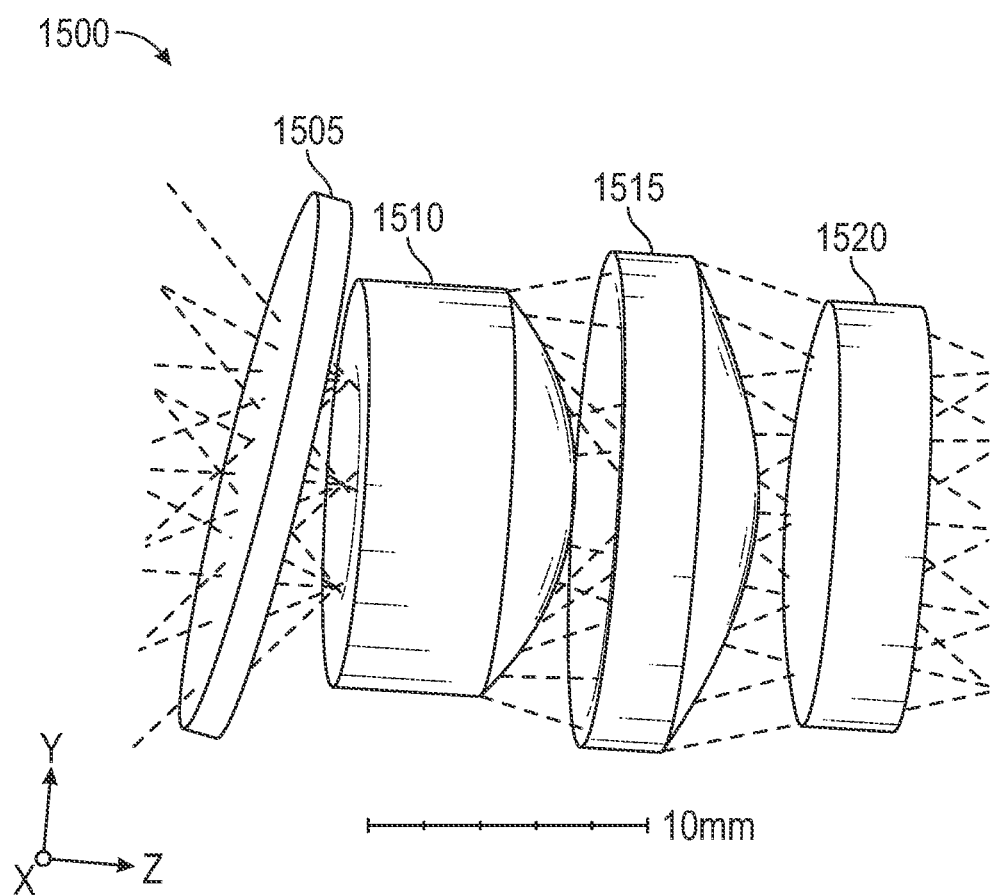

FIG. 15 illustrates a perspective view of an optical system 1500 and trajectories of ray bundles through the optical system 1500 in accordance with one or more embodiments of the disclosure. The optical system 1500 is oriented along three directions X, Y, and Z. The description of the optical system 300 of FIG. 3 generally applies to the optical system 1500 of FIG. 15, with examples of differences and other description provided herein. The optical system 1500 includes a slanted window 1505, a lens element 1510 adjacent to the window 1505, a lens element 1515 adjacent to the lens element 1510, and a lens element 1520 adjacent to the lens element 1515. Electromagnetic radiation transmitted through the window 1505 is directed by the lens elements 1510, 1515, and 1520 to a detector array. An aperture stop is provided in front of the lens element 1510. In an embodiment, the optical components 105 of FIG. 1 may include the window 1505 and the lens elements 1510, 1515, and 1520.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. An imaging device comprising:
    a window configured to transmit electromagnetic radiation associated with a scene;
    a lens system comprising:
        a first lens element configured to receive the electromagnetic radiation from the window and transmit the electromagnetic radiation, wherein the first lens element comprises a first concave surface and a first convex surface opposite the first concave surface, wherein the first concave surface is adjacent to and facing the window, and wherein an aperture stop is positioned between the window and the first concave surface of the first lens element; and
        a second lens element adjacent to the first lens element and configured to receive the electromagnetic radiation and transmit the electromagnetic radiation; and
    a detector array comprising a plurality of detectors, wherein each of the plurality of detectors is configured to receive the electromagnetic radiation from the lens system and generate a thermal image based on the electromagnetic radiation.

2. The imaging device of claim 1, further comprising a lens barrel configured to receive the window, the first lens element, and the second lens element, wherein the second lens element comprises a second concave surface and a second convex surface opposite the second concave surface, and wherein the second concave surface faces the first convex surface of the first lens element.

3. The imaging device of claim 1, further comprising one or more coatings disposed on the first lens element and/or the second lens element, wherein each of the one or more coatings is an anti-reflective coating, a filter coating, and/or a polarization coating.

4. The imaging device of claim 1, further comprising a third lens element adjacent to the second lens element and configured to receive the electromagnetic radiation from the second lens element and direct the electromagnetic radiation to the detector array.

5. The imaging device of claim 4, further comprising a lens barrel configured to receive the window, the first lens element, the second lens element, and the third lens element, wherein the first lens element, the second lens element, and the third lens element are the only lens elements disposed between the window and the detector array.

6. The imaging device of claim 5, further comprising a housing, wherein the lens barrel is coupled to the housing.

7. The imaging device of claim 2, wherein:
    the second convex surface of the second lens element faces the detector array; and
    the first lens element and the second lens element are the only lens elements disposed between the window and the detector array.

8. The imaging device of claim 1, wherein a surface of the window faces the scene, and wherein the first lens element and the second lens element are associated with parameters according to Table 1.

9. The imaging device of claim 1, wherein the electromagnetic radiation comprises mid-wave infrared light and/or long-wave infrared light.

10. The imaging device of claim 1, further comprising a processor configured to process the thermal image to obtain a processed image, wherein the detector array comprises an array of microbolometers, and wherein the window comprises silicon and/or zinc blende.

11. A method of manufacturing the imaging device of claim 1, the method comprising:
    providing the detector array;
    disposing the first and second lens elements at least partially within a lens barrel of the imaging device;
    disposing the window at least partially within the lens barrel; and
    disposing the detector array within a housing.

12. A method of manufacturing the imaging device of claim 1, the method comprising performing calibration in relation to an optical path including the window, the first lens element, the second lens element, and the detector array.

13. A vehicle comprising the imaging device of claim 1, wherein the imaging device is configured to be replaceable with a manufacturer calibrated imaging device and usable without recalibration.

14. A method for providing imaging functionality to a vehicle comprising the imaging device of claim 1, the method comprising:
    mounting the imaging device onto the vehicle;
    operating the imaging device to generate thermal images;
    replacing the imaging device with a manufacturer calibrated imaging device usable without recalibration.

15. A method comprising:
    transmitting, by a window, electromagnetic radiation associated with a scene;
    directing, by a lens system comprising a first lens element adjacent to the window and a second lens element adjacent to the first lens element, the electromagnetic radiation to a detector array, wherein the first lens element comprises a first concave surface and a first convex surface opposite the first concave surface, wherein the first concave surface is adjacent to and facing the window, and wherein an aperture stop is positioned between the window and the first concave surface of the first lens element;

receiving, by the detector array, the electromagnetic radiation; and generating, by the detector array, a thermal image based on the electromagnetic radiation.

16. The method of claim 15, wherein the directing comprises:

directing, by the first lens element, the electromagnetic radiation from the window to the second lens element; and directing, by the second lens element, the electromagnetic radiation to the detector array, wherein the second lens element comprises a second concave surface and a second convex surface opposite the second concave surface, and wherein the second concave surface faces the first convex surface of the first lens element.

17. The method of claim 15, wherein the directing further comprises directing, by a third lens element of the lens system, the electromagnetic radiation from the second lens element to the detector array.

18. The method of claim 17, wherein the directing further comprises directing, by a fourth lens element of the lens system, the electromagnetic radiation from the third lens element to the detector array, and wherein the electromagnetic radiation comprises mid-wave infrared light and/or long-wave infrared light.

19. The imaging device of claim 2, wherein a curvature associated with the second concave surface is substantially equal to a curvature associated with the second convex surface.

20. The imaging device of claim 19, wherein the curvature associated with the second concave surface of the second lens element is substantially equal to a curvature associated with the first convex surface of the first lens element.

* * * * *